United States Patent Office 3,176,000
Patented Mar. 30, 1965

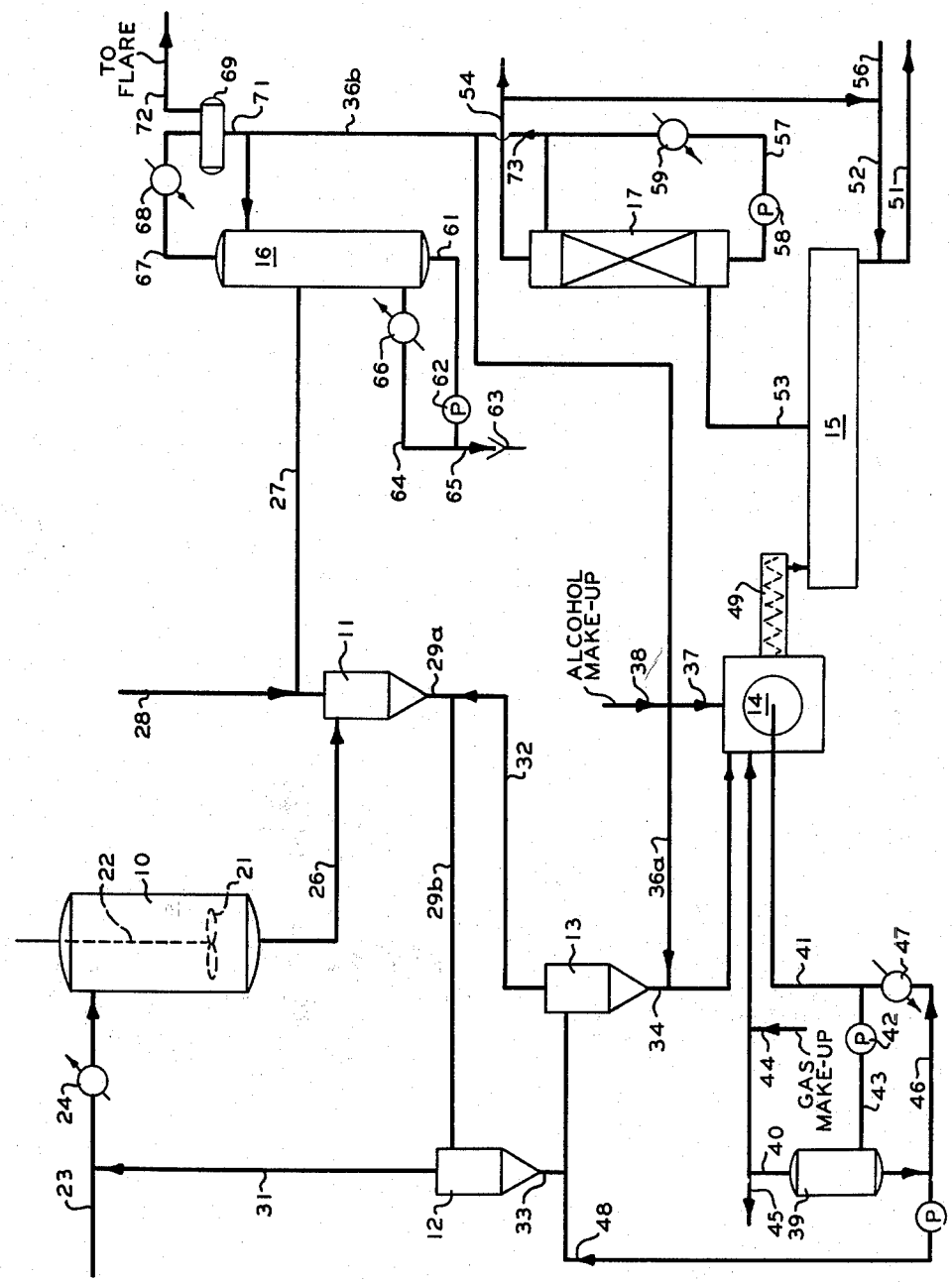

3,176,000
PROCESS FOR TREATMENT OF SOLID OLEFIN POLYMERS FOR REMOVAL OF INITIATOR RESIDUES
Jack S. Scoggin, Bartlesville, Okla., assignor to Phillips Petroleum Company, a corporation of Delaware
Filed Sept. 25, 1961, Ser. No. 140,526
9 Claims. (Cl. 260—93.7)

This invention relates to the process and apparatus for treatment of solid olefin polymers for removal of initiator residues.

The polymerization of 1-olefins in the presence of initiator systems comprising a heavy metal component, such as titanium trichloride or a titanium trichloride-aluminum trichloride complex, and an organometal, such as triethylaluminum or diethylaluminum chloride, is well known and the polymers thus produced have found numerous uses. This polymerization method produces a polymer which contains a residue of the initiator system, this residue comprising the heavy metal and halogen which are bound, in some way, in the polymer. For some applications, the presence of this initiator residue is not objectionable but, in other cases, it is necessary that it be removed. For instance, these residues tend to react with some antioxidants used in such polymers to form discolored products. Halogen residues tend to cause corrosion of metal parts used in handling the polymers, such as molding.

An object of this invention is to provide an improved process for treating solid polymers to remove these initiator residues. A further object of this invention is to provide apparatus suitable for use in this process.

Other objects and advantages of this invention will be apparent to those skilled in the art upon reading this application which includes a drawing showing schematically apparatus suitable for carrying out this process.

Broadly, the invention resides in a process for removing organometal initiator residue from a solid olefin polymer using first, second, and third cyclone separation zones, comprising slurrying the polymer containing the initiator residue with a hot extractant which will remove the residue but is not a solvent for the polymers, passing the slurry to a first cyclone separation zone, removing an overflow from said first cyclone separation zone, mixing slurry obtained from the lower end portion of said first cyclone separation zone with the overflow from said third cyclone separation zone and passing this last mixture to said second cyclone separation zone, removing an overflow from said second cyclone separation zone, mixing slurry obtained from the lower end portion of said second cyclone separation zone with an additional portion of said extractant and passing this last mixture to a third cyclone separation zone, mixing slurry obtained from the lower end portion of said third cyclone separation zone with an additional portion of said extractant and passing this last mixture to a filter zone, removing liquid from said filter zone, removing solid polymer from said filter zone, and drying said polymer.

In another aspect, the invention resides in the combination of apparatus components suitable for carrying out the above process.

Suitable 1-olefins whose polymers can be treated according to this invention include those having 2 to 8 carbon atoms per molecule including ethylene, propylene, 1-butene, 1-pentene, 2-methyl-1-butene, 2-methyl-1-pentene, 4-methyl-1-pentene, 3,3-dimethyl-1-butene, 3,3-dimethyl-1-hexene, and the like. Mixtures of 2 or more monomers can be used in the polymerization.

Many polymerization systems have been disclosed for the polymerization of these monomers. I believe that my invention will find its greatest use in the treatment of polymers from polymerization system which frequently produce a polymer having a high proportion of initiator residue. For instance, in the mass polymerization of propylene, the monomer is liquefied and contacted in a reaction zone with a two or more component initiator system wherein one component is an organometal or metal hydride compound of a metal of Groups I, II or III of the Periodic System and another component is a compound of a metal of Groups IV-A or V-A of the Periodic Table. Since there is no extraneous diluent present, the polymer, in some instances, contains a larger quantity of initiator residue than when the same system is used in the presence of a solvent or diluent. However, the polymer treated by the system of my invention can be prepared by a solution process or by vapor phase or slurry operation.

Suitable organometal compounds include organometal compounds of mono-, di- or trivalent metals of Groups I, II or III, particularly aluminum, gallium, indium, beryllium, sodium, potassium, lithium, rubidium, cesium, magnesium, cadmium, mercury, zinc, barium, or these compounds wherein one or more, but not all, of the hydrocarbon groups is replaced by hydrogen or halogen. The organo groups can be quite large, compounds being applicable which have 15 or more carbon atoms in each alkyl, cycloalkyl or aryl group, and 40 carbon atoms or more in the molecule. Specific examples of such organometal compounds include trimethylaluminum, triethylaluminum, triisobutylaluminum, a mixture of diethylaluminum chloride and ethylaluminum dichloride, sometimes referred to as ethylaluminum sesquichloride, diethylaluminum hydride, ethylaluminum dichloride, or diethylaluminum chloride, taken alone, trioctylaluminum, tridodecylaluminum, triphenylaluminum, triphenylgallium, diphenylberyllium, dicyclohexylberyllium, cyclohexylzinc fluoride, methylaluminum dichloride, dimethylaluminum chloride, dibutylaluminum bromide, octylaluminum diiodide, dipropylgallium fluoride, dicyclohexylgallium chloride, phenylgallium dibromide, eicosylgallium dibromide, tetradecylgallium fluoride, diphenylindium chloride, octylindium difluoride, cyclohexylindium dibromide, methylberyllium bromide, and the like.

The metal hydrides can include, as specific examples, aluminum hydride, lithium aluminum hydride, barium hydride, gallium hydride, indium hydride, sodium aluminum hydride, and potassium beryllium hydride.

The compounds of the metals of Groups IV-A and V-A of the Periodic System include the oxides, hydrides, halides, oxyhalides and salts of organic acids, usually having 20 or less carbon atoms, such as formic acid. It is usually preferred to employ compounds of titanium, zirconium, hafnium, thorium, vanadium, niobium and tantalum. Of the various compounds, it is generally preferred to employ the titanium halides, including the chlorides, fluorides, bromides and iodides, particularly the tri- and tetrachlorides, the tri- and tetrabromides, and the tri- and tetraiodides of titanium, a particularly preferred species being titanium trichloride.

A third catalyst component which can be advantageously used includes the alkali metal and ammonium halides, and aluminum halides (where the catalyst also includes another metal compound such as a titanium compound), a halogen, a hydrogen halide, an organophosphorus-containing compound, and a peroxide.

The level of initiator residue in the final polymer product which can be tolerated depends on the ultimate use, processing utilized to achieve this state, the additives used for thermal and oxidative stabilization and the like. For instance, it has been found that polypropylene stabilized with phenolic type stabilizers, such as 4,4'-thio-bis- (6-tert-butyl-m-cresol) are particularly susceptible to color change during molding at elevated temperatures. This color change has been found to be proportional to the amount of titanium present in the polymer with as little as 25 p.p.m. causing a color change from a translucent white to a rust brown. Surprisingly, it has been found possible by the method of this invention to reduce the titanium content to a range at which this darkening is not a problem.

The treating agents used in my processes are materials which are extractants for the initator residue but in which the polymer is substantially insoluble at the conditions of treatment. Suitable extractants include 1 to 5 carbon aliphatic alcohols, carboxylic acids and hydroxy-substituted carboxylic acids containing from 2 to 20 carbon atoms per molecule, anhydrides of said acids, and mixtures thereof.

The alcohols include methyl alcohol, ethyl alcohol, both propyl alcohols, and the various butyl and pentyl alcohols. Methyl and isopropyl alcohol are preferred.

Examples of suitable acids are acetic, propionic, n-butyric, isobutyric, valeric, caproic, heptanoic, and caprylic acids.

Solid carboxylic acids can be used when a suitable solvent therefor is included. Typical examples are undecylenic, lauric, palmitic, and arachidic acids; oxalic, malonic, succinic, glutaric, and adipic acids; phenylacetic, hydrocinnamic acid and benzoic acids.

It is preferred that the treatment of my invention be carried out before the polymer is contacted with water or air although traces of water can be tolerated.

The treatment should be carried out at a temperature below the agglomeration point of the polymer and under suitable conditions such that the treatment is carried out with all materials in liquid phase until the final drying operation. These conditions will vary for the particular polymer being treated and the particular treating agent used. The "agglomeration point" can be determined by immersing small particles of the polymer in the treating agent and slowly elevating the temperature until the polymer particles agglomerate. The preferred temperature limit is at least 5° F. less than this agglomeration temperature.

The process of my invention can probably be best understood from the study of the drawing which comprises a single figure. The principal apparatus elements shown on this drawing include a slurry tank 10, a first cyclone 11, a second cyclone 12, a third cyclone 13, a filter 14, a dryer 15, a fractionation column 16, and a scrubber 17. Slurry tank 10 is provided with an agitator 21 on shaft 22 driven by a motor (not shown). Feed conduit 23, having heater 24 therein, extends to and communicates with tank 10. Conduit 26 extends from the lower end portion of tank 10 to the feed inlet of cyclone 11. Conduit 27 extends from the overflow of cyclone 11 to the inlet of fractionator 16. Communicating with conduit 27 is a conduit 28 adapted to supply additional material to conduit 27. Conduits 29a and 29b extend from the slurry outlet of cyclone 11 to the inlet of cyclone 12. Conduit 31 extends from the overflow line of cyclone 12 to conduit 23, the connection with conduit 23 being before heater 24. Conduit 32 extends from the overflow line of cyclone 13 to conduit 29a. Conduit 33 extends from the slurry outlet of cyclone 12 to the inlet of cyclone 13. Conduit 34 extends from the slurry outlet of cyclone 13 to the feed inlet of filter 14. Conduits 36a and 36b, which will be further described hereinafter, communicate with conduit 34 and conduit 37 extends from conduit 36a to filter 14. Conduit 36b is also provided with alcohol makeup conduit 38. Gas supply conduit 44 also communicates with filter 14, this conduit extending from conduit 40 which extends from the upper end portion of knockout drum 39. Removal conduit 41 extends from filter 14 to pump 42 and conduit 43 extends from pump 42 to knockout drum 39. Gas makeup line 44 communicates with conduit 45. Conduit 46, having cooler 47 therein, extends from the lower end portion of knockout drum 39 to conduit 41. Conduit 48 extends from the lower end portion of knockout drum 39 to conduit 33. Screw conveyor 49 extends from filter 14 to dryer 15. Product removal conduit 51 extends from dryer 15. Dryer 15 is also provided with purge gas supply conduit 52. Conduit 53 extends from dryer 15 to the lower end portion of scrubber 17. Gas removal conduit 54 extends from the upper end portion of scrubber 17 to conduit 52, conduit 52 also communicating with gas makeup conduit 56. Conduit 57, having pump 58 and cooler 59 therein, extends to the upper end portion of scrubber 17 from the lower end portion of scrubber 17.

Fractionator 16 is provided with removal conduit 61, having pump 62 therein, which extends to conduit 65 for outlet to drain 63. Recycle line 64 extends from conduit 61 to the kettle of fractionator 16, this conduit having heater 66 therein. Conduit 67, having condenser 68 therein, extends to accumulator 69. Conduit 71 extends from the lower end portion of accumulator 69 to the upper end portion of fractionator 16. Conduit 72 extends from the upper end portion of accumulator 69 to a flare (not shown). Conduits 36a and 36b, previously referred to, extend from line 71 to conduit 34. Conduit 73 extends from the conduit 57 to conduit 36. Obviously, additional pumps, valves, and the like, will be necessary but, since these do not constitute essential features of my invention, they are not shown.

In the operation of my process, using this apparatus, the polymer from the reactor is mixed, in conduit 23, with the extractant supplied by conduit 31. The amount of extractant should be sufficient to form a free-flowing slurry but the amount is not otherwise critical. This slurry is heated in heater 24 to a temperature of at least 200° F., the upper limit being at least 5° F. lower than the agglomeration point. For polypropylene this temperature range is generally in the range of 200 to 310° F., preferably from 250 to 290° F. This heated slurry is then introduced into slurry tank 10 wherein it is agitated for a period of time. This time need not be long, and can range from as little as 1 or 2 minutes up to an hour. Generally 5 to 10 minutes residence time is satisfactory. After a suitable residence time, the slurry is passed through conduit 26 to cyclone 11 wherein approximately two-thirds of the extractant is removed overhead and the polymer with the remaining extractant is passed by conduits 29a and 29b to cyclone 12. The overflow from cyclone 13 is used to slurry the polymer from cyclone 11, this liquid being supplied through conduit 32. The liquid removed in cyclone 12 supplies the extractant for the initial mixing as described above. The wet polymer from cyclone 12 is reslurried in the extractant removed from the filter 14 and passed by conduit 33 to cyclone 13. The wet product from cyclone 13 is mixed with purified extractant and the slurry passed to filter 14 wherein it is further washed. This filter can be one of those well-known in the art such as a Bird-Young filter. Inert gas and air passed through the product to aid in extractant removal and it is believed that this operation is well known in the art. A screw conveyor 49 conveys the polymer to dryer 15 wherein final traces of the extractant are removed. This is done by passing an inert gas (nitrogen, flue gas, etc.) through the polymer to purge final traces of the extractant. This inert gas is introduced by conduit 52 and passes countercurrently to the polymer which is removed by conduit 51.

The mixture of inert gas and vaporized extractant are removed by conduit 53 and passed to scrubber 17. Cold extractant is circulated in this column being removed from the bottom thereof, cooled in heat exchanger 59, and reintroduced into the top. This results in condensation of extractant vapors. The inert gas is removed overhead and returned to dryer 15 by conduits 54 and 52.

The overflow from cyclone 11 is passed to fractionator 16. This fractionator is provided to separate the initiator residue from the extractant. For this purpose, I prefer to add a material which is considerably higher boiling than the extractant, this material being added through conduit 28. This permits easier separation and removal of the initiator residue and the added material from the lower end portion of the column through conduit 61. The overhead from the column, consisting primarily of the extractant is condensed by heat exchanger 68 and passed to accumulator 69. Non-condensables can be removed by conduit 72 and reflux supplied to the column by conduit 71.

The following example illustrates my invention and is considered to be a preferred form thereof.

conduit 51. The mixture of inert gas and alcohol vapor is removed by conduit 53 and passed to scrubber 17 operated with a top temperature of 105° F. and a bottom temperature of 133° F., the scrubber being operated at atmospheric pressure. Isopropyl alcohol is removed from the bottom of this scrubber through conduit 57, cooled to a temperature of 105° F. and reintroduced into the top of the scrubber. Uncondensed material is removed from the top of the scrubber and returned by conduit 54 to dryer 15. Isopropyl alcohol recovered in the scrubber is returned to the system through conduits 73 and 36b.

A material balance for this operation is given in the following table, all amounts being set forth in pounds per unit time:

| Stream No. | Poly-propylene | TiCl₃ | Diethyl-aluminum Chloride | Normal decane | Heavy Alkylate | Propyl-ene | Propane | Isopropyl Alcohol | Inert gas | Air |
|---|---|---|---|---|---|---|---|---|---|---|
| 23 | 78,200 | 112 | 7 | 40 | 0 | 1,158 | 129 | 0 | 0 | 0 |
| 31 | 0 | 32 | 2 | 12 | 0 | 339 | 38 | 500,000 | 0 | 0 |
| 26 | 78,200 | 144 | 9 | 52 | 0 | 1,497 | 167 | 500,000 | 0 | 0 |
| 27 | 70 | 111 | 7 | 40 | 0 | 1,158 | 129 | 386,200 | 0 | 0 |
| 29a | 78,130 | 33 | 2 | 12 | 0 | 339 | 38 | 113,800 | 0 | 0 |
| 32 | 10,000 | 7 | 0 | 0 | 0 | 77 | 9 | 500,200 | 0 | 0 |
| 29b | 88,130 | 40 | 2 | 12 | 0 | 416 | 47 | 614,000 | 0 | 0 |
| 33 | 88,130 | 8 | 0 | 0 | 0 | 77 | 9 | 114,000 | | |
| 48 | 0 | 2 | 0 | 0 | 0 | 18 | 2 | 500,000 | 0 | 0 |
| 34 | 78,130 | 3 | 0 | 0 | 0 | 18 | 2 | 113,800 | 0 | 0 |
| 36a | 0 | 0 | 0 | 0 | 0 | 0 | 0 | 198,200 | | |
| 38 | 0 | 0 | 0 | 0 | 0 | 0 | 0 | 2,543 | 0 | 0 |
| 37 | 0 | 0 | 0 | 0 | 0 | 0 | 0 | 215,455 | 0 | 0 |
| 41 | 0 | 2 | 0 | 0 | 0 | 18 | 2 | 537,200 | 53,700 | 13,400 |
| 44 | 0 | 0 | 0 | 0 | 0 | 0 | 0 | 0 | 2,680 | 650 |
| 45 | 0 | 0 | 0 | 0 | 0 | 0 | 0 | 1,455 | 2,680 | 650 |
| 40 | 0 | 0 | 0 | 0 | 0 | 0 | 0 | 37,200 | 53,700 | 13,400 |
| 49 | 78,130 | 1 | 0 | 0 | 0 | 0 | 0 | 26,000 | 0 | 0 |
| 53 | 0 | 0 | 0 | 0 | 0 | 0 | 0 | 31,200 | 12,100 | 0 |
| 51 | 78,130 | 1 | 0 | 0 | 0 | 0 | 0 | 0 | 0 | 0 |
| 56 | 0 | 0 | 0 | 0 | 0 | 0 | 0 | 0 | 1,210 | 0 |
| 52 | 0 | 0 | 0 | 0 | 0 | 0 | 0 | 5,200 | 12,100 | 0 |
| 57 | 0 | 0 | 0 | 0 | 0 | 0 | 0 | 381,000 | 0 | 0 |
| 73 | 0 | 0 | 0 | 0 | 0 | 0 | 0 | 25,520 | 0 | 0 |
| 54 | 0 | 0 | 0 | 0 | 0 | 0 | 0 | 480 | 1,210 | 0 |
| 28 | 0 | 0 | 0 | 0 | 4,000 | 0 | 0 | 0 | 0 | 0 |
| 65 | 70 | 111 | 7 | 40 | 4,000 | 0 | 0 | 50 | 0 | 0 |
| 36b | 0 | 0 | 0 | 0 | 0 | 0 | 0 | 385,682 | 0 | 0 |
| 72 | 0 | 0 | 0 | 0 | 0 | 1,158 | 129 | 468 | 0 | 0 |

*Example*

In this example, polypropylene prepared using an initator comprising diethylaluminum chloride and titanium trichloride was used. The solid polymer was mixed with isopropyl alcohol in line 23, heated to 280° F. and stirred in slurry tank 10. Slurry tank 10 was operated at 280° F. and 160 p.s.i.a. The hot slurry was passed to cyclone 11 and the overflow introduced into fractionator 16 operating with a top temperature of 180° F. at a pressure of 15 p.s.i.a and a bottom temperature of 300° F. at a pressure of 15 p.s.i.a. A heavy alkylate fraction was mixed with this overflow before introduction into fractionator 16. The slurry, at a temperature of 165° F. was passed from the slurry outlet of cyclone 11, after mixing with the overflow from cyclone 13, to the inlet of cyclone 12. Cyclone 13 was operated at a temperature of 120° F. and the material from cyclone 12 was passed thereto through conduit 33 using isopropyl alcohol to slurry the same, the isopropyl alcohol being recovered from filter 14 and mixed with the solid polymer by introduction through conduit 48. Substantially pure isopropyl alcohol supplied by conduit 36a is mixed with the polymer from cyclone 13 in conduit 34 and the slurry passed through filter 14 at a temperature of 110° F. The filtered product, containing some occluded alcohol, is passed by screw conveyor 49 to dryer 15. This product still contains approximately 25 weight percent alcohol. Dryer 15 is heated with steam, this being supplied in an amount of 720 pounds per hours at 70 p.s.i.a. To remove the final amount of alcohol, an inert purge gas introduced at the downstream end of dryer 15 through conduit 52 at a temperature of 250° F. Dry polymer containing less than two parts per million titanium chloride is recoverd in As many possible embodiments can be made of this invention without departing from the scope thereof, it is to be understood that all matter herein set forth is to be interpreted as illustrative and not as unduly limiting the invention.

I claim:

1. A process for removing initiator residue resulting from use of a metal compound wherein the metal is selected from the group consisting of Group IV–A and V–A metals in combination with a compound selected from the group consisting of organo metals and metal hydrides of Groups I, II, and III from a solid olefin polymer using first, second, and third cyclone separation zones, comprising slurrying the polymer containing the initiator residue with an extractant selected from the group consisting of aliphatic alcohols, carboxylic acids and anhydrides of said acids which will remove the residue but is not a solvent for the polymer, passing the slurry to a first cyclone separation zone, removing an overflow from said first cyclone separation zone, mixing slurry obtained from the lower end portion of said first cyclone separation zone with the overflow from said third cyclone separation zone and passing this last mixture to said second cyclone separation zone, removing an overflow from said second cyclone separation zone, mixing slurry obtained from the lower end portion of said second cyclone separation zone with an additional portion of said extractant and passing this last mixture to a third cyclone separation zone, mixing slurry obtained from the lower end portion of said third cyclone separation zone with an additional portion of said extractant and passing this last mixture to a filter zone, removing liquid from said filter zone, removing solid polymer from said filter zone, and drying said polymer.

2. The process of claim 1 wherein said extractant is a 1–5 carbon alcohol.

3. The process of claim 1 wherein said extractant is methyl alcohol.

4. The process of claim 1 wherein said extractant is isopropyl alcohol.

5. The process of claim 1 wherein said polymer is a polymer of a 1-olefin of 3 to 8 carbon atoms.

6. The process of claim 1 wherein said polymer is polyethylene.

7. The process of claim 1 wherein said polymer is polypropylene.

8. The process of claim 1 wherein said initiator residue contains titanium.

9. A process for removing initiator residue resulting from use of a metal compound wherein the metal is selected from the group consisting of Group IV–A and V–A metals in combination with a compound selected from the group consisting of organo metals and metal hydrides of Groups I, II, and III from polypropylene using first, second, and third cyclone separation zones, comprising slurrying polypropylene containing initiator residue with isopropyl alcohol, heating the resulting slurry to a temperature of 280° F. and maintaining said slurry at 280° F. for 5 to 10 minutes, thereafter passing said slurry to a first cyclone separation zone, mixing the overflow from said first cyclone separation zone with heavy alkylate and passing the mixture to a fractionation zone, removing a mixture of heavy alkylate and catalyst residue from the lower end portion of said fractionation zone, removing isopropyl alcohol from the upper end portion of said fractionation zone, mixing slurry obtained from the lower end portion of said first cyclone separation zone with the overflow from said third cyclone separation zone and passing this last mixture to said second cyclone separation zone, utilizing the overflow from said second cyclone separation zone as the stream of isopropyl alcohol in the initial slurrying operation, mixing slurry obtained from the lower end portion of said second cyclone separation zone with isopropyl alcohol and passing this last mixture to a third cyclone separation zone, mixing slurry obtained from the lower end portion of said third cyclone separation zone with isopropyl alcohol recovered in said first fractionation zone and passing this last mixture to a filter zone, removing isopropyl alcohol from said filter zone and utilizing same to mix with the slurry removed from said second cyclone separation zone, passing solid polypropylene wet with isopropyl alcohol from said filter zone to a drying zone supplied with heated inert gas, removing dry polypropylene from said drying zone, removing a mixture of inert gas and isopropyl alcohol vapor from said drying zone and passing same to scrubbing zone supplied with cooled isopropyl alcohol wherein isopropyl alcohol is condensed and inert gas is recovered for supply to said drying zone.

References Cited in the file of this patent

UNITED STATES PATENTS

| | | |
|---|---|---|
| 2,754,968 | Vegter | July 17, 1956 |
| 2,914,518 | Cottle | Nov. 24, 1959 |
| 2,962,488 | Horne | Nov. 29, 1960 |